(12) United States Patent
Masghati et al.

(10) Patent No.: US 6,404,567 B2
(45) Date of Patent: Jun. 11, 2002

(54) BONDER CHUCK AND OPTICAL COMPONENT MOUNTING STRUCTURE INTERFACE

(75) Inventors: Mona Masghati, Cambridge; Livia M. Racz, Belmont; Robert L. Payer, Pepperell; Dale C. Flanders, Lexington, all of MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/797,530

(22) Filed: Mar. 1, 2001

Related U.S. Application Data

(63) Continuation-in-part of application No. 09/648,349, filed on Aug. 25, 2000
(60) Provisional application No. 60/186,925, filed on Mar. 3, 2000.

(51) Int. Cl.[7] .................................................. G02B 7/02
(52) U.S. Cl. ........................................ 359/819; 359/822
(58) Field of Search ................................ 359/819, 820, 359/822, 872; 385/136, 137

(56) References Cited

U.S. PATENT DOCUMENTS 4,979,664 A * 12/1990 Lynons et al. ............ 228/180.2
4,993,809 A * 2/1991 Leib et al. .................... 359/19
5,313,333 A * 5/1994 O'Brien et al. ............. 352/820
6,320,706 B1 * 11/2001 Richard et al. ............. 359/822

FOREIGN PATENT DOCUMENTS

WO         WO 01/37019 A2 * 11/2000 ............ G02B/6/42

* cited by examiner

Primary Examiner—Georgia Epps
Assistant Examiner—Saeed Seyrafi
(74) Attorney, Agent, or Firm—Grant Houston

(57) ABSTRACT

An optical component is adapted for pick-and-place-style installation on an optical submount or bench and compatible with a chuck of a bonder that picks-up the optical component, places it on the optical bench, and then typically solder bonds the optical component to the bench. In the current implementation, this optical component comprises an optical element, such as an optical fiber, lens, or MOEMS device, that is attached to a plastically deformable mounting structure. The optical component has a bench-attach surface that is used to bond the optical component to an optical bench. Further, the optical component has a bonder chuck engagement surface to which a bonder chuck attaches to manipulate the optical component, such as install it, on the optical bench.

16 Claims, 5 Drawing Sheets

BONDER CHUCK AND OPTICAL COMPONENT MOUNTING STRUCTURE INTERFACE

RELATED APPLICATIONS

This application is a Continuation-in-Part of U.S. application Ser. No. 09/648,349, filed on Aug. 25, 2000, and claims the benefit of the filing date of Provisional Application No. 60/186,925, filed Mar. 3, 2000, the entire teachings of both applications being incorporated herein by this reference.

BACKGROUND OF THE INVENTION

The production of integrated, hybrid micro-optical systems requires the precision installation of optical elements, such as lenses, fibers and micro-optical electro-mechanical systems (MOEMS) devices, on a submount or optical bench. In such systems, the beam diameters are typically less than one millimeter. As a result, these optical elements must typically be placed on the bench with accuracies of better than 20 micrometers ($\mu$m). Preferably, however, attachment accuracy of better than 10 $\mu$m is preferred, with some applications requiring installation to an accuracy of better than 2 $\mu$m.

Further, the production of mechanically robust systems typically requires solder attachment processes within the hermetic package. This protocol avoids some of the long-term instabilities associated with epoxy bonding along with problems linked to carbon deposition on active device facets such as lasers.

One approach to manufacturing these integrated micro-optical systems utilizes a combination of optical element mounting structures and pick-and-place style bonders. Specifically, flip-chip bonders have been used in such systems. Further, the mounting structures may be designed to be susceptible to plastic deformation to enable active and/or passive alignment of the associated optical elements after the installation of the mounting structures on the bench.

SUMMARY OF THE INVENTION

The present invention is directed to optical component that is adapted for pick-and-place-style installation on an optical submount or bench. The invention is also directed to the co-design of the optical component and the chuck, which picks-up the optical component, places it on the optical bench, and then typically solder bonds the optical component to the bench.

In general, according to one aspect, the invention features an optical component. This optical component comprises an optical element, such as an optical fiber, lens, or MOEMS device. The optical component has a bench-attach surface that is used to bond the optical component to an optical bench. Further, the optical component has a bonder chuck engagement surface to which a bonder chuck attaches to manipulate the optical component, such as install it on the optical bench.

In the preferred embodiment, the optical component comprises a mounting structure, which in some cases is plastically deformable to enable the alignment of an optical element to the surrounding optical system after attachment to the optical bench.

Further, in the typical implementation, two bonder chuck engagement surfaces are provided, one either lateral side of the optical element.

Preferably, the bonder chuck engagement surface is on a top surface of a foot portion of the mounting structure, with the bench-attach surface being on a bottom surface of that foot.

In one implementation, armatures extend between a base of the optical component and an optical element interface, to which the optical element is installed on the mounting structure.

In general, according to another aspect, the invention also features an optical component manipulation system. This system comprises an optical component that has an optical element, a bench attach surface, and a bonder chuck engagement surface. A bonder then comprises a vacuum chuck that engages the optical component at the bonder chuck engagement surface to then place the optical component on the optical bench.

Finally, according to still another aspect, the invention can be characterized as an optical component installation process. The process comprises picking an optical component with a vacuum chuck of a bonder at an engagement surface and then placing that optical component into engagement with an optical bench. A chuck heater is then activated to initiate bonding between the optical component and the optical bench.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
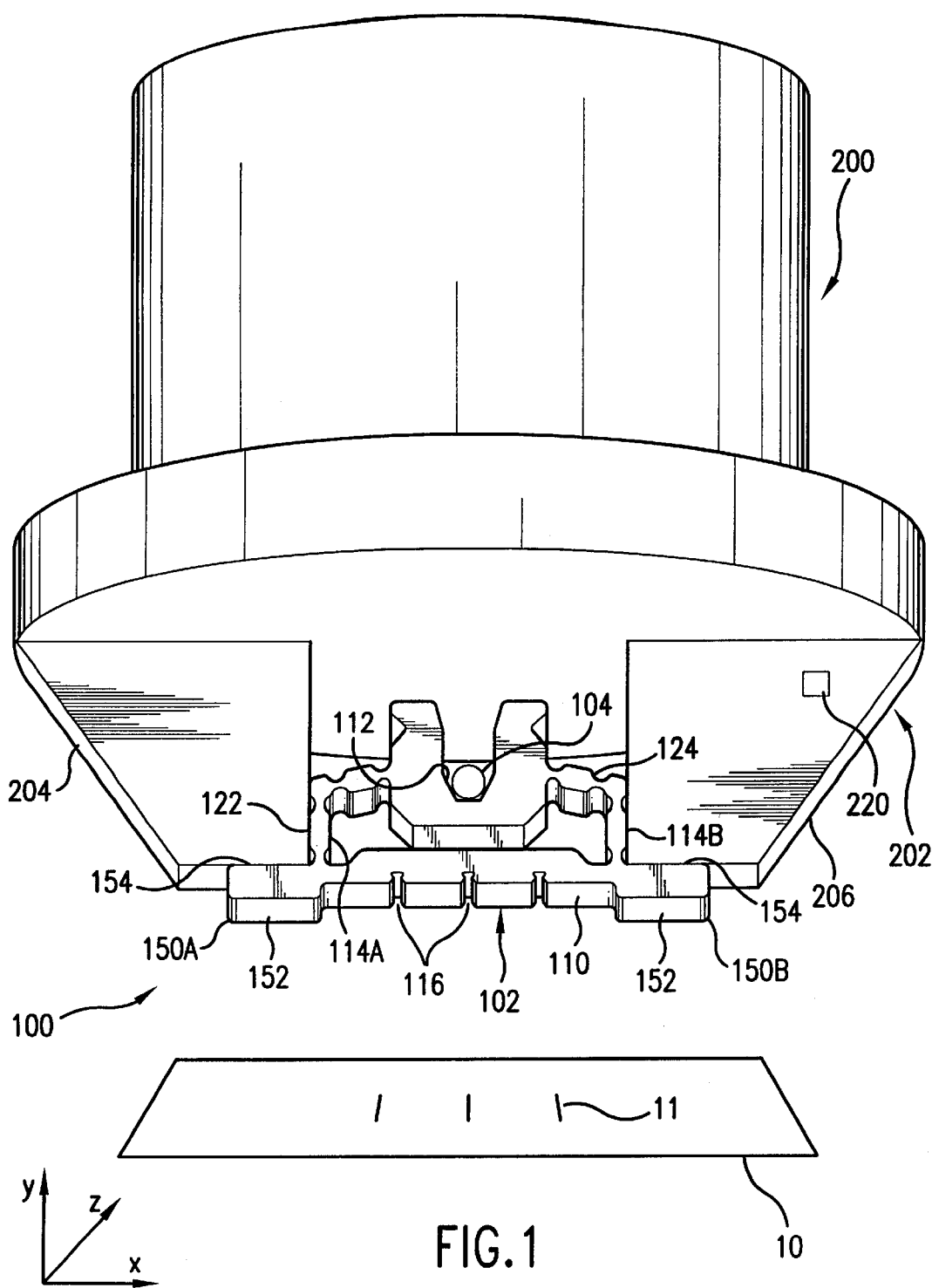
FIG. 1 is a perspective view of a bonder chuck holding an optical component according to the present invention.

FIG. 1 shows an optical component 100 being manipulated by a bonder 200, illustrating the codesign of the optical component 100 and the bonder chuck 202 according to the principles of the present invention.

The optical component 100 comprises a mounting structure 102 and an optical element, which in this illustrated example is an optical fiber 104.

The mounting structure comprises a base 110, an optical element interface 112, and left and right armatures 114A, 114B, which either directly connect, or indirectly connect, the base 110 to the element interface 112.

The base 110 comprises a laterally-extending base surface. In the illustrated example, the base surface extends in a plane of the x and z coordinate axes, generally.

The base/base surface comprise alignment features 116. In some embodiments, these features are adapted to mate with opposite-gendered alignment features of an optical bench 10. In the specific illustrated implementation, the alignment features are used by machine vision systems to match to alignment marks or features 11 of the bench 10.

In the illustrated implementation, each of the armatures 114A, 114B comprises two segments. The vertically-extending segments 122, i.e., extending at least partially in the y-axis direction, have two flexures along their length, in the illustrated embodiment. These flexures are regions of reduced cross-sectional area in the segments, which regions extend in the direction of the z-axis. The vertically-extending segments 122 facilitate the positioning of the optical element 104 along the x-axis. A purpose of the flexures is to isolate regions of microstructural change, such as occurring in plastic deformation, in order to make the yield forces, for example, readily predictable. Also, the flexures localize deformation on the armatures and consequently decrease the amount of force/movement required in the optical component before plastic deformation is initiated in the armature.

Horizontally-extending (i.e., extending in the direction of the x-axis) segments 124 extend at least partially in the x-axis direction. In the illustrated embodiment, two flexures are found on each segment.

The horizontally-extending segments 124 allow the positioning of an optical element, generally vertically along the y-axis. Armature deformation is facilitated by respective flexures.

In one implementation, the optical element 104 is bonded to the optical element interface 112, and specifically a bonding surface. This bonding is accomplished either through polymeric adhesive bonding or preferably solder bonding. In other implementations, thermocompression bonding, thermosonic bonding, laser welding, reactive bonding, microwave bonding, or other bonding method is used.

The optical element interface, in some other implementations, comprises a port for enabling an optical signal to pass transversely through the structure. This enables optical access to the optical element component by facilitating the propagation of an optical signal to and/or away from the element.

The mounting structure 102 further comprises a right foot 150A and a left foot 150B. The bottom of each of these feet provides bench-attach surfaces 152. In the preferred embodiment, these bench-attach surfaces 152 are solder bonded to the bench 10. In some implementations, the surfaces 152 are coated with predeposited solder or solder material such as gold. In other implementations, only the bench is coated with predeposited solder. Preforms used in still other embodiments.

In the illustrated embodiment, the top surfaces of the feet function as the bonder chuck engagement surfaces 154. More specifically, the bonder 200 comprises the bonder chuck 202. The bonder chuck 202 includes a pick-up tool 206 that comprises a left prong 204 and a right prong 206. The tips of these prongs are aligned over the engagement surfaces 154. Typically, they pick-up the mounting structure 102 of the optical component by a vacuum chuck system, although, magnetic engagement can be used in other embodiments.

Figure 2:
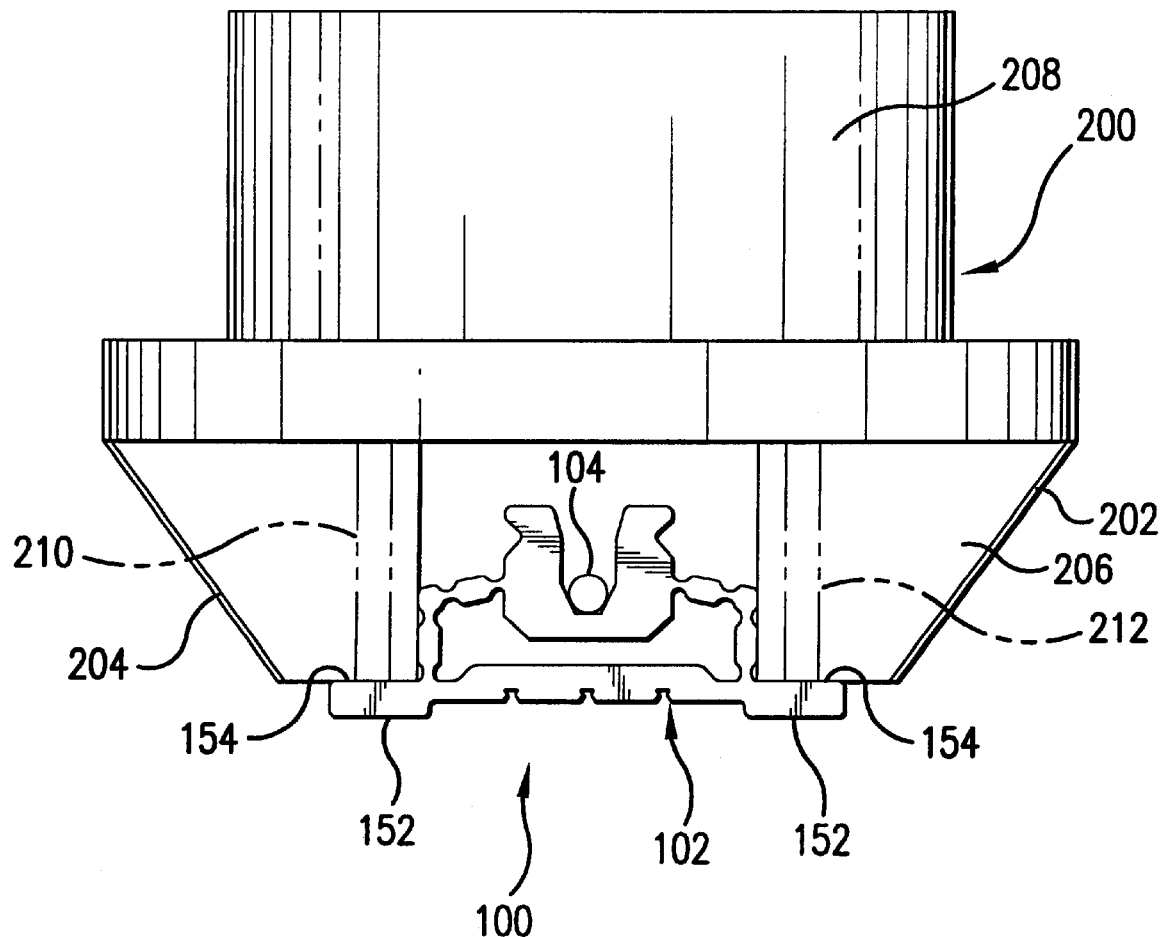
FIG. 2 is a plan, elevation view of the inventive bonder chuck and optical component with the chuck vacuum ports shown in phantom.

FIG. 2 better illustrates the vacuum system of the bonder chuck 202. Specifically, right and left vacuum ports 210, 212 are provided through the left and right prongs 204, 206 of the chuck 202. A vacuum is applied in reservoir 208 and then transferred via these vacuum ports 210, 212 to hold the mounting structure 102 in engagement with the chuck 202.

Figure 3:
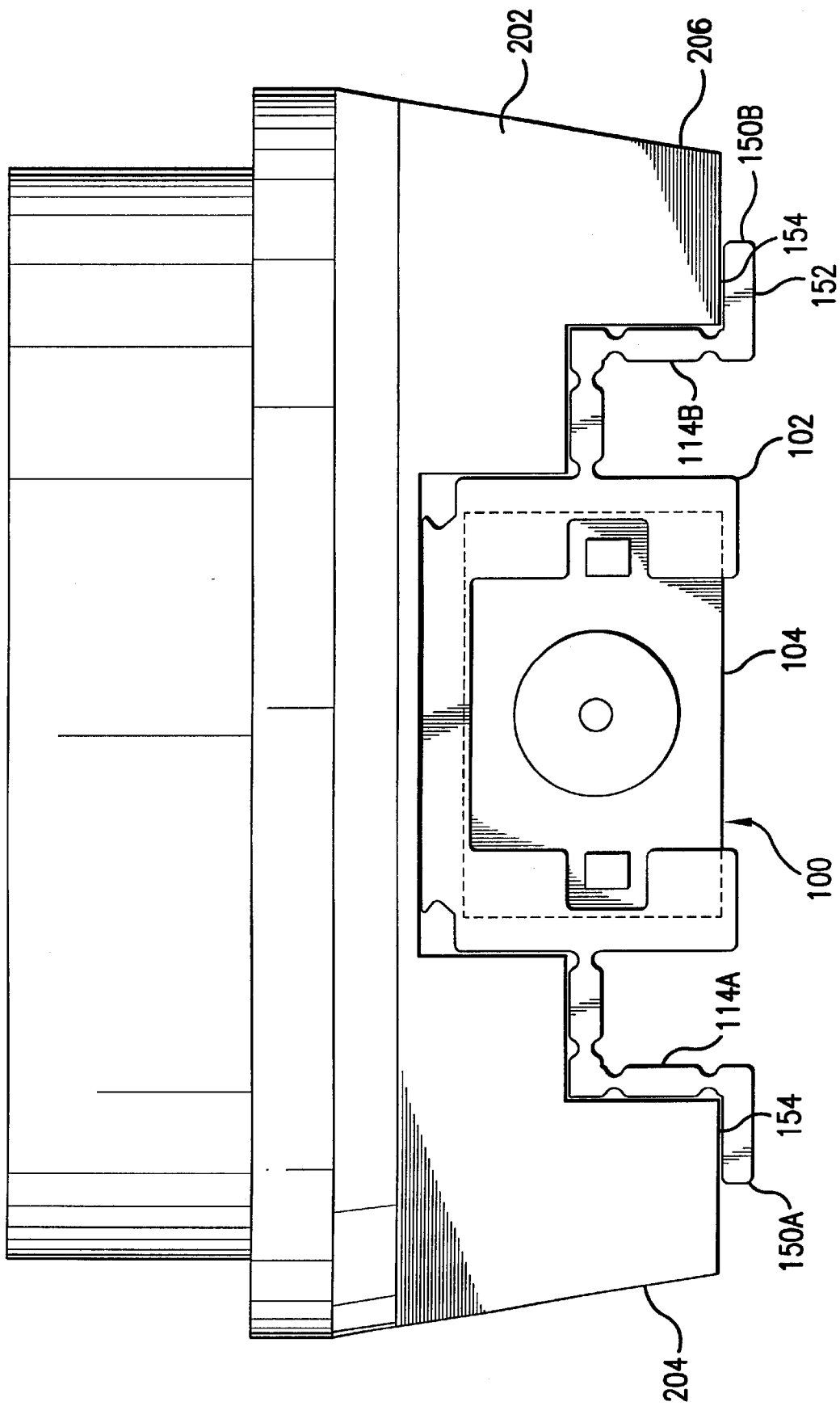
FIG. 3 is a plan elevation view of the bonder chuck holding a MOEMS optical component according to the invention.

FIG. 3 illustrates another embodiment of the chuck 202 and its co-design with the mounting structure 102. Typically, the mounting structure 102 of this optical component 100 holds a MOEMS-type optical element 104. Specifically, in the illustrated example, a Fabry-Perot tunable filter or optical, e.g., HR coated, optical membrane is the optical element 104. In this example, the feet 150A, 150B of the mounting structure 102 have top surfaces that function as the bond chuck engagement surfaces 154, the bottom surfaces of the feet 150 function as the bench attach surfaces 152.

Figure 4:
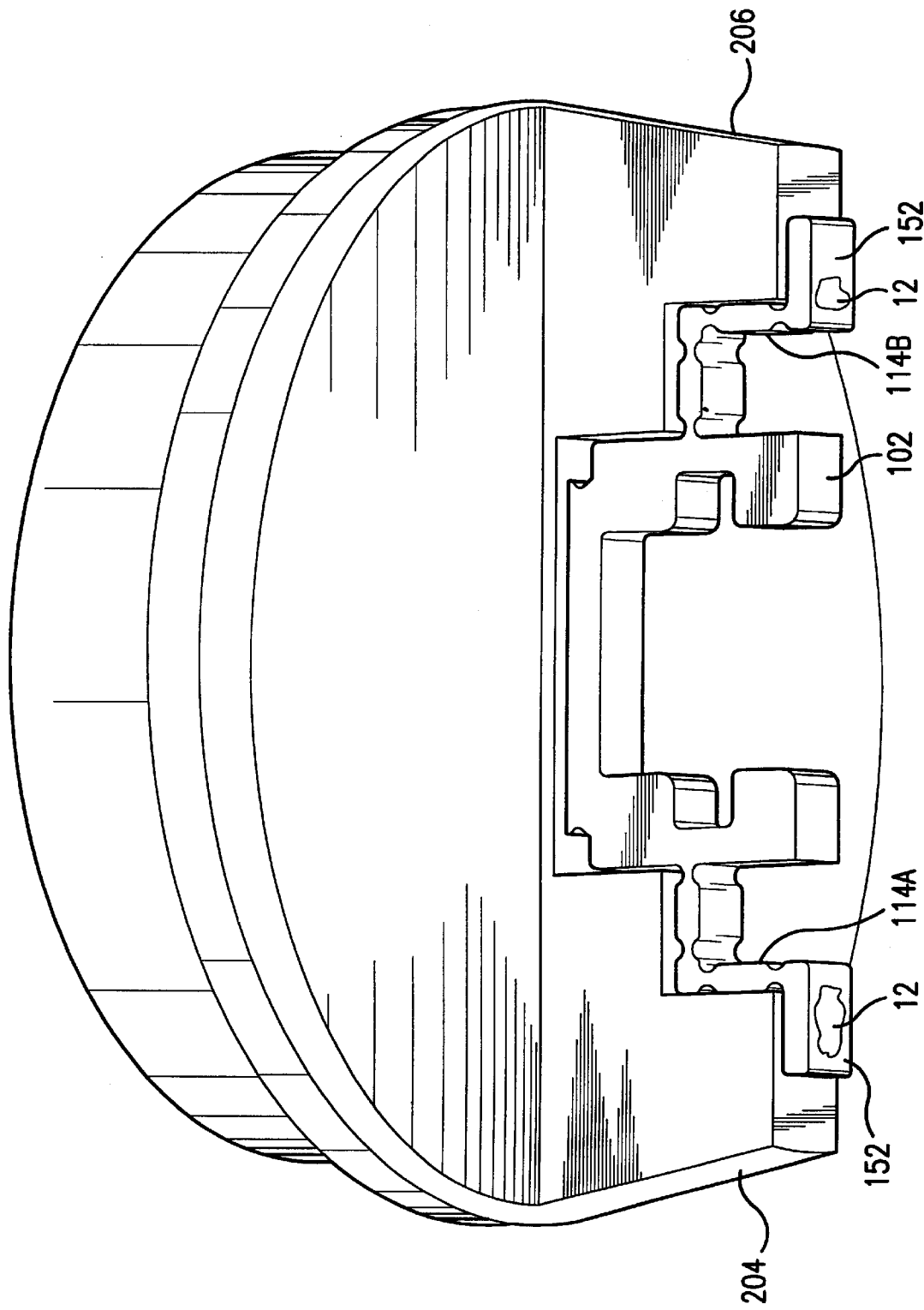
FIG. 4 is a perspective view of the MOEMS mounting structure held by the bonding chuck.

FIG. 4 better shows the bench attach surfaces 152 of the mounting structure 102. In some implementations, these bench attach surface are either gold plated or are have predeposited solder 12 to facilitate the solder bonding process.

Figure 5:
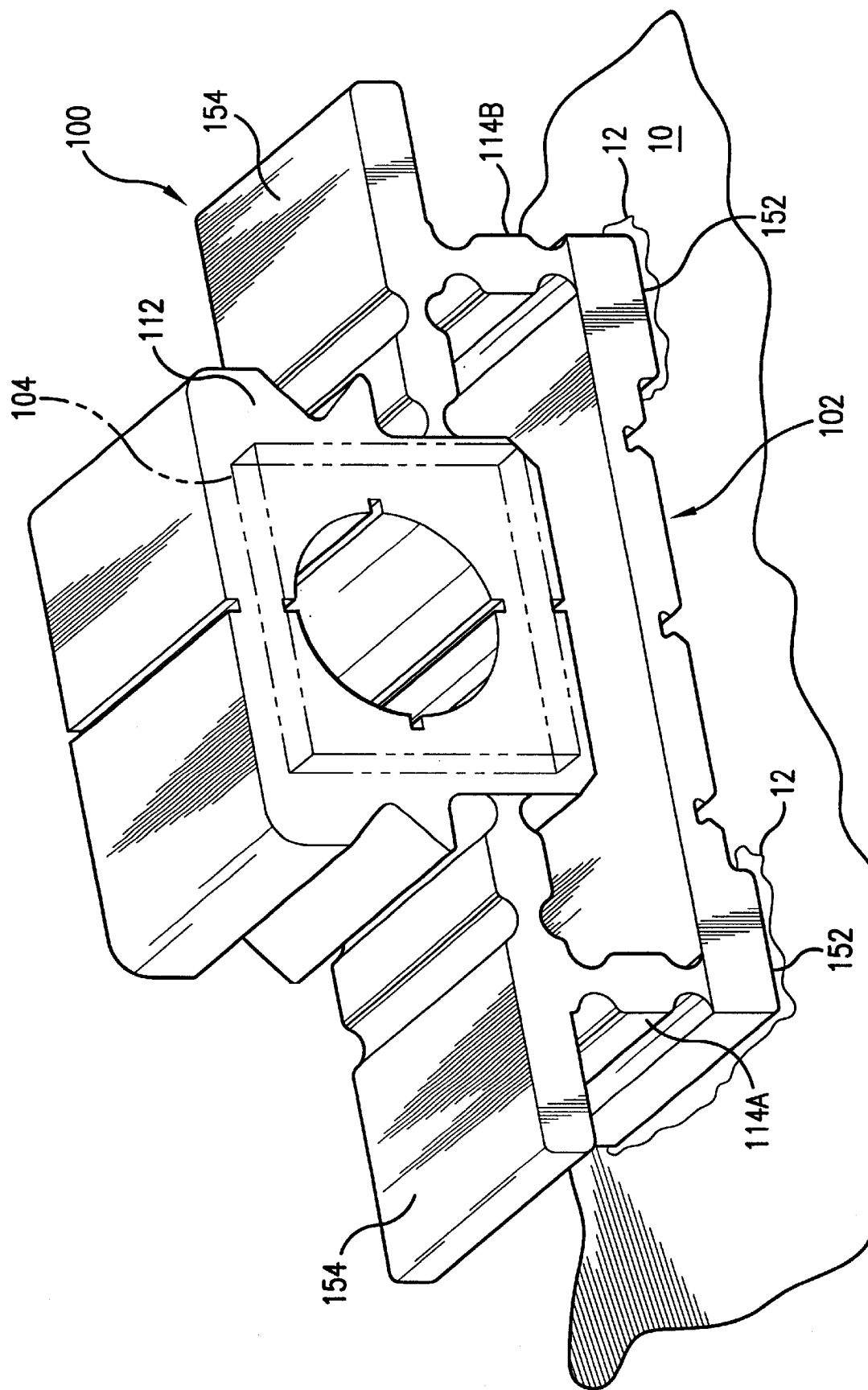
FIG. 5 illustrates another example of a mounting structure having wing portions to facilitate manipulation by the bonder chuck.

FIG. 5 shows still another embodiment of the mounting structure 102. This mounting structure has two bench attach surfaces 152. The bonder chuck engagement surfaces 154, however, are provided on wing portions extending from the armatures 114A, 114B.

Further, in this illustrated embodiment, the optical element 104 is a lens, shown in phantom, that is bonded to interface 112 of the mounting structure 102.

Generally, the embodiment of the mounting structure in FIG. 5 is viewed as less desirable. While easing somewhat the design tolerances of the bonder chuck, when the mounting structure 102 is installed on the bench, there is a risk of deformation to the right and left armatures 114A, 114B if the bonder 200 applies excessive force when placing the component onto the bench 10. Further, when a chuck heater 220 (see FIG. 1) is activated, the prongs 204 indirectly heat the solder 12 between the bench 10 and the bench-attach surfaces 152. In this embodiment, that heat must travel over a longer distance, and not simply across the foot portion as in the embodiments of FIG. 1 and FIG. 4, for example.

With reference to FIGS. 1 and 2, in operation, the bonder 200, and specifically the chuck 202, is placed into engagement with the bonder chuck engagement surfaces 154 and the vacuum applied to ports 210, 212. The optical component 100 is then manipulated and/or placed into engagement with the optical bench 10. A chuck heater 220 is then activated to heat the mounting structure 202 and specifically melt the solder 12, see FIG. 4, between the bench attach surfaces 152 and the bench 10 to thereby solder bond, in the preferred embodiment, the optical component to the bench 10, see FIG. 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical component comprising:

an optical element;

a bench-attach surface that is used to connect the optical component to an optical bench; and a bonder chuck engagement surface to which a bonder chuck attaches to manipulate the optical component.

2. An optical component as claimed in claim 1, wherein the optical component further comprises a mounting structure, the optical element being attached to the mounting structure.

3. An optical component as claimed in claim 2, wherein the optical component is plastically deformable to enable alignment of the optical element after attachment to the optical bench.

4. An optical component as claimed in claim 2, wherein the mounting structure further comprises optical element interface on which the optical element in attached.

5. An optical component as claimed in claim 1, further comprising two bonder chuck engagement surfaces on either lateral side of the optical element.

6. An optical component as claimed in claim 1, wherein the bonder chuck engagement surface is on a top surface of a foot portion, which has the bench-attach surface on a bottom surface.

7. An optical component as claimed in claim 1, wherein the optical component further comprises a mounting structure that comprises a base, an optical element interface, and at least one armature, extending between the base and the interface, and the bonder chuck engagement surface being on wing portion of the armature.

8. An optical component manipulation system, comprising:
   an optical component comprising: an optical element, a bench-attach surface that is used to connect the optical component to an optical bench, and a bonder chuck engagement surface to which a bonder chuck attaches to manipulate the optical component; and
   a bonder comprising a vacuum chuck that engages the optical component at the bonder chuck engagement surface to place the optical component on the optical bench.

9. An optical component manipulation system as claimed in claim 8, wherein the bonder further comprises a chuck heating system to facilitate solder bonding of the optical component to the optical bench.

10. An optical component manipulation system as claimed in claim 8, wherein the optical component further comprises a mounting structure.

11. An optical component manipulation system as claimed in claim 10, wherein the mounting structure is plastically deformable to enable alignment of the optical element after attachment to the optical bench.

12. An optical component manipulation system as claimed in claim 10, wherein the mounting structure further comprises optical element interface on which the optical element is attached.

13. An optical component manipulation system claimed in claim 8, further comprising two bonder chuck engagement surfaces on either lateral side of the optical element.

14. An optical component manipulation system as claimed in claim 8, wherein the bonder chuck engagement surface is on a top surface of a foot portion, which has the bench-attach surface on a bottom surface.

15. An optical component installation process, comprising:
   picking an optical component with a vacuum chuck of a bonder at an engagement surface;
   placing the optical component into engagement with an optical bench; and
   activating a chuck heater to initiate a bonding operation between the optical component and the optical bench.

16. An optical component manipulation system as claimed in claim 8, wherein the optical component further comprises a mounting structure that comprises a base, an optical element interface, and at least one armature, extending between the base and the interface, and the bonder chuck engagement surface is on wing portion of the armature.

* * * * *